United States Patent [19]
Kwan

[11] 3,835,673
[45] Sept. 17, 1974

[54] ANTI-SKYJACK DEVICE

[76] Inventor: Sai Kheong Kwan, 14 Bukit Tunggal Rd., Singapore, Singapore

[22] Filed: Oct. 6, 1972

[21] Appl. No.: 295,553

[52] U.S. Cl. ................................................ 70/14
[51] Int. Cl. ........................................ E05b 73/00
[58] Field of Search ............... 70/16, 15, 17, 14, 57; 63/154.5, 15.5, 15.6, 15.65; D45/10

[56] References Cited
UNITED STATES PATENTS

| | | | |
|---|---|---|---|
| 727,193 | 5/1903 | Pettijohn | 70/16 |
| 1,294,938 | 2/1919 | Mullen | 40/129 A UX |
| 1,529,546 | 3/1925 | McKenzie | 70/16 |
| 2,707,828 | 5/1955 | Stewart | 63/15.5 X |
| 3,146,614 | 9/1964 | Von Frentzius | 70/16 |

*Primary Examiner*—Robert L. Wolfe
*Attorney, Agent, or Firm*—Edwin E. Greigg

[57] ABSTRACT

The invention relates to an anti-skyjacking device which is key-locked to both hands of an individual prior to boarding an aircraft with the key then being placed with that person's luggage and not accessible until arrival at the destination airport.

7 Claims, 3 Drawing Figures

PATENTED SEP 17 1974  3,835,673

ANTI-SKYJACK DEVICE

This invention relates to improvements in devices which are particularly useful for impeding or restricting the use of a person's hands and, more particularly, is intended to prevent the hands of a person, on whom the device is attached, from being able to firmly grasp or grip any heavy object by reason of controlling the movement of the fingers.

Heretofore, when an officer representing the law was traveling with a prisoner in detention, he either was manacled to the prisoner or could secure an element of this fettering device to some sufficiently large object that the prisoner could not escape. However, such devices are incapable of serving to prevent skyjacking, which has recently reached a staggering stage, since no one on the aircraft knows until after the aircraft is in flight that a person even has the intention to hold up a commercial aircraft, and by such act kidnaps scores of passengers while in flight and detains them for ransom, or is on that particular aircraft until after take-off.

Accordingly, it is the principle object of this invention to provide a device that can be readily locked to both hands of each passenger at the airport prior to take-off of the aircraft, the key being placed with the luggage of that respective passenger and not thereafter accessible to that person until he has departed the aircraft at his destination and claimed his luggage.

A further object of the invention is to provide a compact structure which is provided with one element that is adapted to be secured to the finger of the wearer and not removable by him until he attains his destination, this element being integral with another element that is arranged to be received in the palm of the person's hand so that he is merely capable, while wearing the structure, of performing the normal functions of eating, drinking, writing, using toilet facilities, fastening his seat belt, etc.

A still further object of the invention is to provide a structure which, when secured to both of the hands of the wearer, limits or controls the movement of all fingers except the index finger and thumb.

These and other objects of the invention will become more apparent from a reading of the following specification taken in conjunction with the drawing, in which.

Turning now to the view in FIG. 1, there is clearly shown the left hand and wrist of a person to which has been secured the device that comprises the subject matter of this patent application and which will be referred to hereinafter as the "anti-skyjack device."

The anti-skyjack device comprises a concave-convex element 10, to which is secured either integrally or in other suitable manner, so as to be incapable of removal, a collar 12, the interior wall of which is partially threaded as shown at 14 for a purpose that will become apparent as the description progresses.

Figure 1:
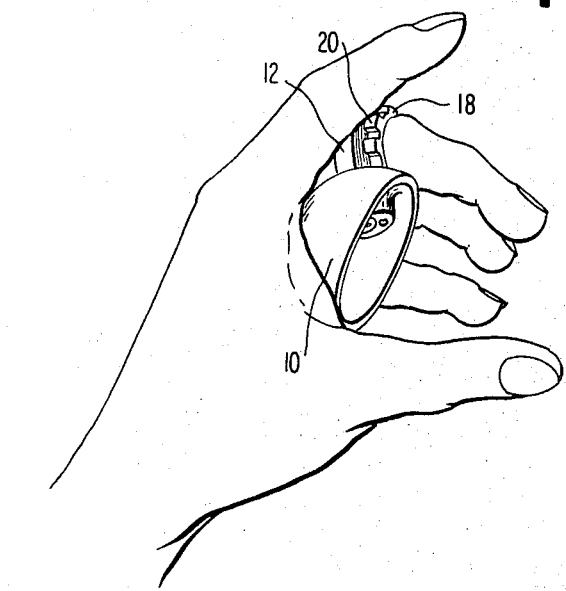
FIG. 1 is a perspective view of the improved device attached to the left hand of a person.

As well shown in FIG. 1, the concave-convex element 10 is arranged to be positioned with its convex exterior surface against the palm of the hand as shown, this being achieved by slipping the collar 12 over the middle finger and moving it rearwardly toward the palm of the hand until the collar assumes the position of a conventional decorative ring adjacent to the knuckle joint of the middle finger, where it may be secured and not removed without proper authority.

Figure 2:
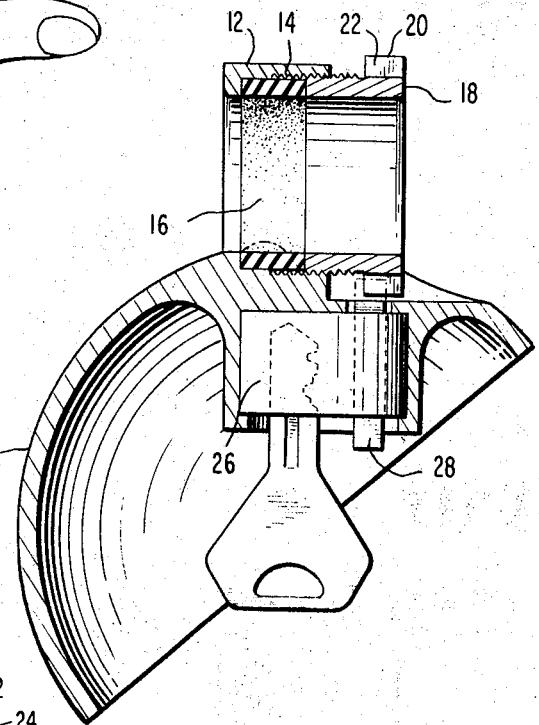
FIG. 2 is a cross-sectional view of the structure clearly showing the cooperative elements.

Referring at this time to FIG. 2, it will be observed that a resilient band member 16 is positioned in snug engagement with the interior of collar 12 and is arranged to partially overlie the threaded area 14, as shown.

A finger-size adjustment member 18 is rotatably positioned in the collar, as shown, and includes an enlarged annular ring-like member 20 which is provided with alternating notches and projections 22 and 24, respectively, for a purpose that will now be explained.

It will be noted also from the view of FIG. 2 that the concave surface of the element 10 includes an integral lock assembly provided with a conventional-type, key-operated cylinder 26 that includes a slidable bolt 28, this bolt being arranged to cooperate with the spaced notches 22 of the annular ring member 20 so that once the ring member is rotated to squeeze the resilient band 16 down into firm contact with the middle finger of the hand to which it is attached and thereby locked and the key removed, the anti-skyjack device cannot be removed by the wearer without first obtaining the key from an authorized person to disengage the bolt so that the annular ring 20 can be rotated in the opposite direction to free the device from each of the hands.

Figure 3:
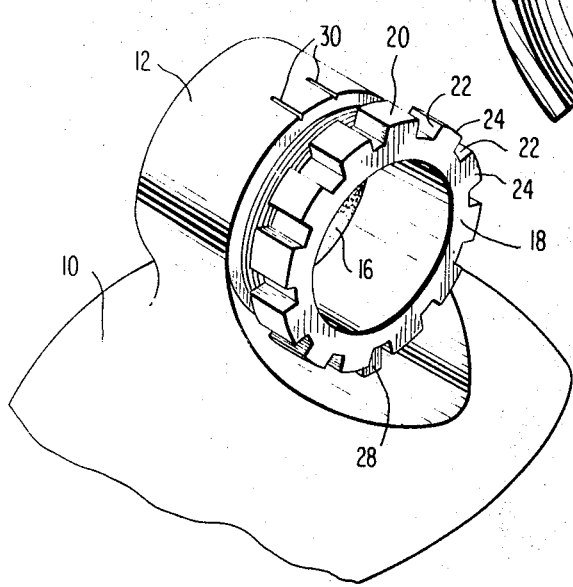
FIG. 3 is a perspective view of the locking mechanism showing the indicia markings on the collar.

In FIG. 3 is shown a perspective view of the adjustment ring 20 provided with the alternate projections 24 and notches 22 and indicia means 30 which are in positive alignment with one of the notches. This arrangement of the notch and cooperating indicia makes it possible to positively correlate the proper notch on the ring with the slidable bolt 28 so that once pressure is exerted on the middle finger to securely fasten the anti-skyjack device thereon by rotation of the ring 20, proper adjustment can be made to accommodate the annular notched ring with the locking bolt 28 so that the key can be removed from the cylinder 26, placed with the luggage of the particular person to which the device has been attached and is not removable until arrival into the airport and the luggage removed from the aircraft.

That which is claimed is:

1. A device to be worn on the hand of a person to restrict the use thereof while permitting limited freedom of movement of each individual finger of the hand comprising an element having concavo-convex surfaces positionable adjacent to the palm portion of the hand with said convex surface in contact with the palm portion of the hand, which element serves to interfere with the capability of the hand to grasp and grip another object while permitting lateral movement of some of the fingers and movement away from said element of at least some of the fingers, and means carried on said convex surface for fastening said element to one of the fingers of the wearer to prevent unauthorized removal of the device, said means for fastening to the finger being adjustable to the size thereof.

2. A device as claimed in claim 1, wherein said means for fastening to the finger includes a rotatable means provided with a detent means.

3. A device as claimed in claim 2, wherein the detent means is arranged to cooperate with lock means.

4. A device as claimed in claim 3, wherein the lock means is carried on the concave surface.

5. A device as claimed in claim 3, wherein the detent means includes a slidable bolt means.

6. A device as claimed in claim 1, wherein said means for fastening includes indicia means.

7. A device as claimed in claim 4, wherein the lock means is key operated.

* * * * *